(12) United States Patent
Morton et al.

(10) Patent No.: US 7,406,664 B1
(45) Date of Patent: Jul. 29, 2008

(54) SYSTEM FOR INTEGRATING HTML WEB SITE VIEWS INTO APPLICATION FILE DIALOGS

(75) Inventors: Michael J. Morton, Seattle, WA (US); Michael P. Arcuri, Seattle, WA (US); Samudra Sengupta, Kirkland, WA (US); Arulseelan Thiruppathi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 881 days.

(21) Appl. No.: 09/882,985

(22) Filed: Jun. 15, 2001

(51) Int. Cl.
*G06F 3/048* (2006.01)
*G06F 3/00* (2006.01)
*G06F 15/16* (2006.01)

(52) U.S. Cl. ........................ 715/809; 715/808; 715/738; 715/741; 709/203

(58) Field of Classification Search ................. 715/738, 715/739, 760, 764, 808, 809, 810, 853, 854, 715/855, 968, 501.1, 741; 709/203
See application file for complete search history.

(56) References Cited

U.S. PATENT DOCUMENTS

| | | | | |
|---|---|---|---|---|
| 6,009,441 A * | 12/1999 | Mathieu et al. | ............. | 715/516 |
| 6,239,796 B1 * | 5/2001 | Alexander | ................... | 715/809 |
| 6,493,733 B1 * | 12/2002 | Pollack et al. | .............. | 715/513 |
| 6,529,910 B1 * | 3/2003 | Fleskes | ......................... | 707/10 |
| 6,631,512 B1 * | 10/2003 | Onyeabor | .................... | 717/100 |
| 6,632,249 B2 * | 10/2003 | Pollock | ....................... | 715/513 |
| 2001/0018858 A1 * | 9/2001 | Dwek | ........................... | 84/609 |
| 2002/0010932 A1 * | 1/2002 | Nguyen et al. | ................. | 725/51 |
| 2002/0032611 A1 * | 3/2002 | Khan | .......................... | 705/26 |
| 2002/0065849 A1 * | 5/2002 | Ferguson et al. | ............ | 707/513 |
| 2002/0129054 A1 * | 9/2002 | Ferguson et al. | ............ | 707/503 |

* cited by examiner

*Primary Examiner*—Tadesse Hailu
*Assistant Examiner*—Ting Zhou
(74) *Attorney, Agent, or Firm*—Workman Nydegger

(57) ABSTRACT

A Web view page is provided by a browser module operating with a dialog box of an application program. The browser module displays a Web view page in a browser window within the dialog box of the application program, enabling a user to perform browser functions and application program functions by selecting an element in the Web view page. The browser module detects whether a selected element can be processed by the browser module alone, and if not, communicates the selected element to the dialog box of the application program for processing. A server that is capable of interacting with the Web view page implements the functions requested by the user.

42 Claims, 14 Drawing Sheets

SYSTEM FOR INTEGRATING HTML WEB SITE VIEWS INTO APPLICATION FILE DIALOGS

FIELD OF THE INVENTION

The present invention generally relates to a method and system for integrating browser functionality into application programs, and more specifically, to integrating Web view pages into application program file dialog boxes to provide more flexible and customized functions and displays for management of files within applications.

BACKGROUND OF THE INVENTION

Current office productivity application programs, such as word processing and spreadsheet applications, can interface with servers and other remote computers via traditional network technology (e.g., using Distributed Authoring and Versioning (DAV)) to enable users to manage files and functions on those computers. This capability is especially useful for centrally managing files and implementing other functions among a group of users. For example, it is common for a work group to store documents on a server and for each member to use an application program, such as Microsoft Corporation's WORD™ program, which is executed on a client computer, to open and work on documents stored on the server.

A software application user interface typically includes a dialog box for opening, saving, and performing other functions related to files. The dialog box display currently used to manage files is based on a traditional directory structure view. Specifically, the dialog box displays a simple list of files and/or folders with icons and a limited amount of text, such as folder and file names. Thus, the dialog box user interface is similar to the interface provided by directory management programs, such as Microsoft Corporation's WINDOWS EXPLORER™. Like the directory management programs, the dialog box display is the same, whether managing local files stored on a user's computing device or remote files stored on a server. The functions available in the dialog box are limited to those functions built into the application program or provided by the operating system and accessed by the application program.

Web browsers, such as Microsoft Corporation's INTERNET EXPLORER™ can also display lists of files and folders on local and remote computers. However, Web browsers currently display files and folders in much the same format as an application program dialog box, or as a directory management program, i.e., as a simple list with basic icons and limited text. Like the directory management programs, a browser display includes all folders and/or files at a Uniform Resource Locator (URL) address, including many system-related folders and files that are often confusing and/or irrelevant to most users.

Although general Web pages viewed through a browser can provide a rich variety of functions and display characteristics, browsers have not been adapted to provide any additional functions or display characteristics for viewing directory folders and file lists. Moreover, a browser can not currently be used to perform functions within a local application program, such as causing a local word processing program to save a document file (e.g., carry out a "Save As" operation), because a browser is a separate operating system function or a separate program that is not integral with an application program.

It would be desirable to use the capabilities of a browser to modify and customize functions and displays in application programs, particularly when accessing files. There are substantial benefits that might arise from the combination of a browser and local application program. For example, it would be desirable to change functions and display features for files in a Web page at a central location and to provide the Web page to any application program adapted to access the Web page, without having to upgrade or change the application program itself on each local client computer. Furthermore, additional file management functions, such as variable filtering, might then be provided in a file management Web page. It should also be possible to produce custom views and functions in a Web view page of the directory structure on a server without having to change the application program. For example, a Web view page can be limited to only the folders and file relevant to a specific target user and/or a specific application. Unlike the current ability to filter files only by type (e.g., list all files of the form *.doc), custom Web view pages would make it relatively easy to find specific types of files, such as WORD documents about customers in a specific geographic region when the Web view page is opened in the WORD application. Also, it should be possible to limit the type of file or folder without having to rely on long or cryptic file names. Messages and other information relevant to a target user and/or application program can be made accessible from the application program, instead of on a separate Web page accessed by a conventional separate browser. This feature should eliminate the need for users to switch between a browser and a software application to access such information.

Some application service providers (ASPs) have made attempts to utilize a browser by creating Web-based applications that emulate the functions of a traditional application program, but run entirely within the browser. However, because Web-based applications from ASPs must be downloaded and run entirely within the browser, Web-based applications often require long wait periods for the download to complete, are limited by the capabilities of the browser, and do not provide the extensive application-specific capabilities that are provided in traditional application programs, which are installed directly on a computer.

SUMMARY OF THE INVENTION

The present invention overcomes the above-noted problems and utilizes the flexibility of a browser to achieve the functions discussed by integrating browser capabilities into application programs. Preferably, a browser module is employed in connection with dialog box objects of application programs such as Microsoft Corporation's OFFICE™ programs WORD, EXCEL™, POWERPOINT™ and ACCESS™. The application programs employ the browser module to display a Web view page in a dialog box.

A user can switch between a Web view page display format and a conventional display format in the dialog box. However, the Web view page enables a user to selectively initiate either an application program specific function or a browser specific function by making an appropriate selection of an element in the dialog box. A Web view page element selected by a user is detected and processed by the browser module if the element relates to a browser function. Otherwise, the selected element is processed with the application program. Browser specific functions include requesting an updated Web view page with information sorted or filtered as a function of the selected element, launching a new browser program to display alternative or additional information, and other conventional browser functions. Application program specific functions include file management functions, providing help information, communicating information between application programs, and other conventional functions that utilize a dialog box.

Preferably, the invention is implemented in a network environment of client and server devices. The application program determines whether a computing resource, such as a Web server, supports a Web view page for a particular application program dialog box. This determination can be made by verifying that the server recognizes a unique attribute that identifies an application program function. Thus, the present invention preferably includes a server-side process for recognizing the unique attribute in a request from a client device, and performing a function related to the application program based upon the request. Such functions include generating new Web view pages of folders and files stored on the server, retrieving files, saving files, deleting files, and other file management functions. The server may include a database that stores data defining Web view pages, and templates of Web view pages. The data defining Web view pages may be the same, a subset, or superset of data used to generate full Web pages that are viewed through a standard browser. With the data properties and Web view templates, the server can generate new Web view pages. However, both the server process and client process can be installed and performed on a single computing device, if preferred.

Another aspect of the invention is directed to a machine readable medium for storing machine instructions. When executed by a computing device, the machine instructions cause the computing device to selectively open a dialog box in an application program, and display a Web view page within the dialog box of the application program to enable a user to selectively execute a function from within the dialog box by selecting an element on the Web view page.

Another aspect of the invention is directed to a system for displaying a Web view page within a dialog box of an application program. The system includes a processor; a display in communication with the processor; a user input device in communication with the processor; and a memory in communication with the processor. The memory stores machine instructions and a Web view page that comprise an application program. When executed by the processor, the machine instructions cause it to perform a plurality of functions, including functions generally consistent with the steps of the method described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Operating Environment

Figure 1:
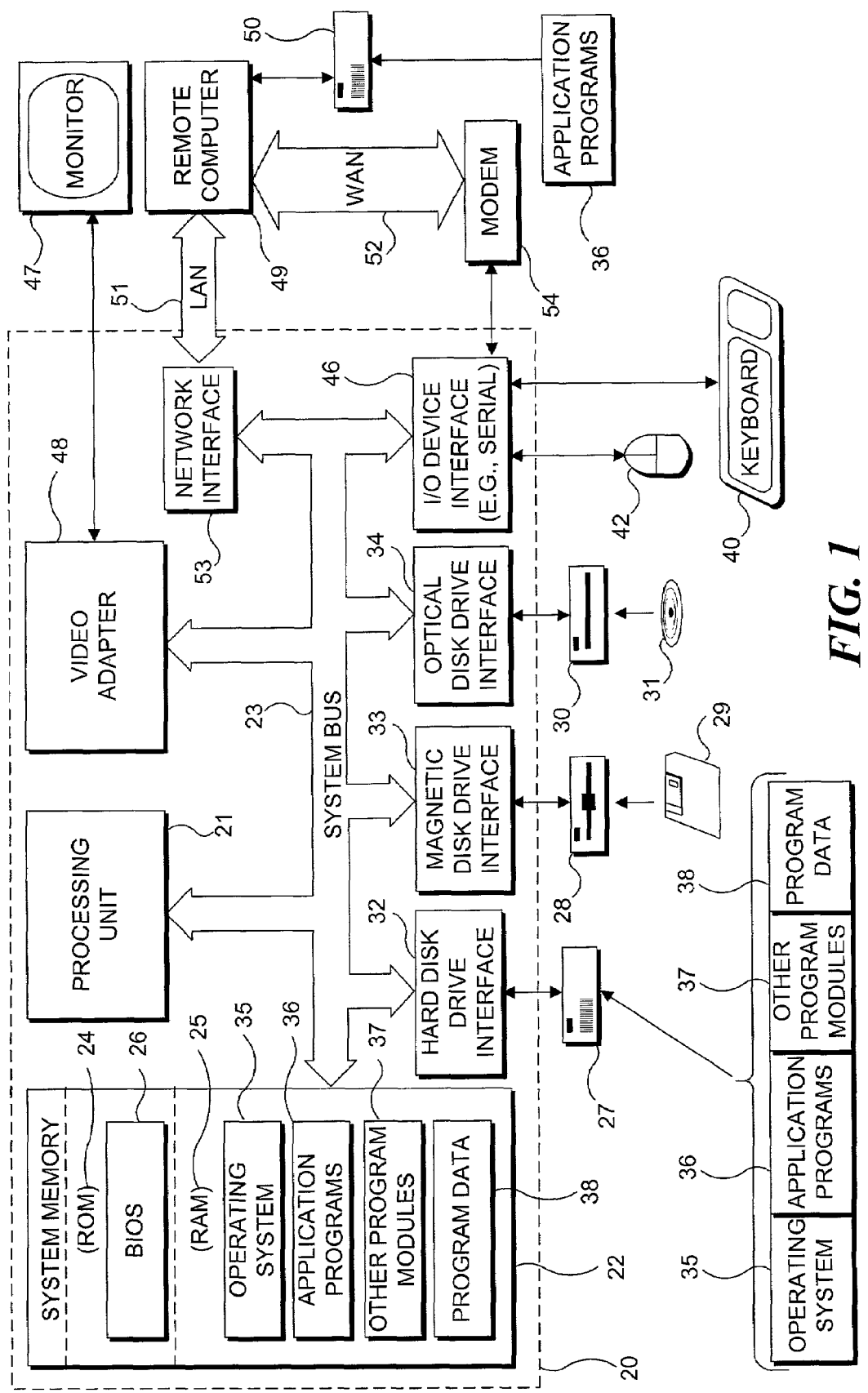
FIG. 1 is a block diagram of an exemplary system for implementing the present invention using a general purpose computing device in the form of a conventional personal computer (PC)

FIG. 1 and the following discussion are intended to provide a brief, general description of a suitable computing environment in which the present invention may be implemented. The invention may be practiced on a single computing device, but will generally be described in regard to a client computing device and a server or other remote computing device connected by a communication network. Although not required, the present invention will be described in the general context of computer executable instructions, such as program modules that are executed by a PC. Generally, program modules include application programs, routines, objects, components, functions, data structures, etc. that perform particular tasks or implement particular abstract data types. Also, those skilled in the art will appreciate that this invention may be practiced with other computer system configurations, particularly in regard to a client device for displaying a Web view page, including hand-held devices, pocket personal computing devices, digital cell phones adapted to execute application programs and to wirelessly connect to a network, other microprocessor-based or programmable consumer electronic devices, multiprocessor systems, network PCs, minicomputers, mainframe computers, and the like. As indicated, the present invention may especially be practiced in distributed computing environments, where tasks are performed by remote processing devices that are linked through a communications network. In a distributed computing environment, program modules may be located in both local and remote memory storage devices.

With reference to FIG. 1, an exemplary system for implementing the present invention includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the PC 20, such as during start up, is stored in ROM 24. The PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules and other data for PC 20. Although the exemplary environment described herein employs a hard disk, removable magnetic disk 29, and removable optical disk 31, it will be appreciated by those skilled in the art that other types of computer readable media, which can store data that are accessible by a computer, such as magnetic cassettes, flash memory cards, digital video disks or DVDs, Bernoulli cartridges, RAMs, (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into PC 20 through input devices such as a keyboard 40 and a pointing device 42. Other input devices (not shown) may include a microphone, joystick, game pad, satellite dish, scanner, or the like. These and other input/output (I/O) devices are often connected to processing unit 21 through an I/O interface 46 that is coupled to the system bus. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48, and is usable to display application programs, Web view pages, and/or other information. In addition to the monitor, PCs are often coupled to other peripheral output devices (not shown), such as speakers (through a sound card or other audio interface—not shown) and printers.

As indicated above, the invention may be practiced on a single machine, however, preferably, PC 20 operates in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets and the Internet.

When used in a LAN networking environment, PC 20 is connected to LAN 51 through a network interface or adapter 53. When used in a WAN networking environment, PC 20 typically includes a modem 54, or other means for establishing communications over WAN 52, such as the Internet. Modem 54, which may be internal or external, is connected to the system bus 23 or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links.

Exemplary Implementation of the Present Invention

The following describes an exemplary implementation in a first preferred embodiment of the present invention corresponding to its use in providing Web view pages in a file management dialog box of an application program. The present invention provides flexible functionality and versatility for displaying data that is readily implemented using Web page technology, but integrates this functionality into the dialog boxes of application programs so that a separate Web browser program need not be executed. Although the invention can be used with any dialog box of any application program, in a preferred embodiment, the present invention preferably integrates browser functions into the file management dialog boxes of a software application. User inputs via the file management dialog box are filtered to the browser module or the application program as appropriate. Thus, the browser-enabled file management dialog box provides more flexible and functional displays of files stored on a remote server or other remote computing device.

Figure 2:
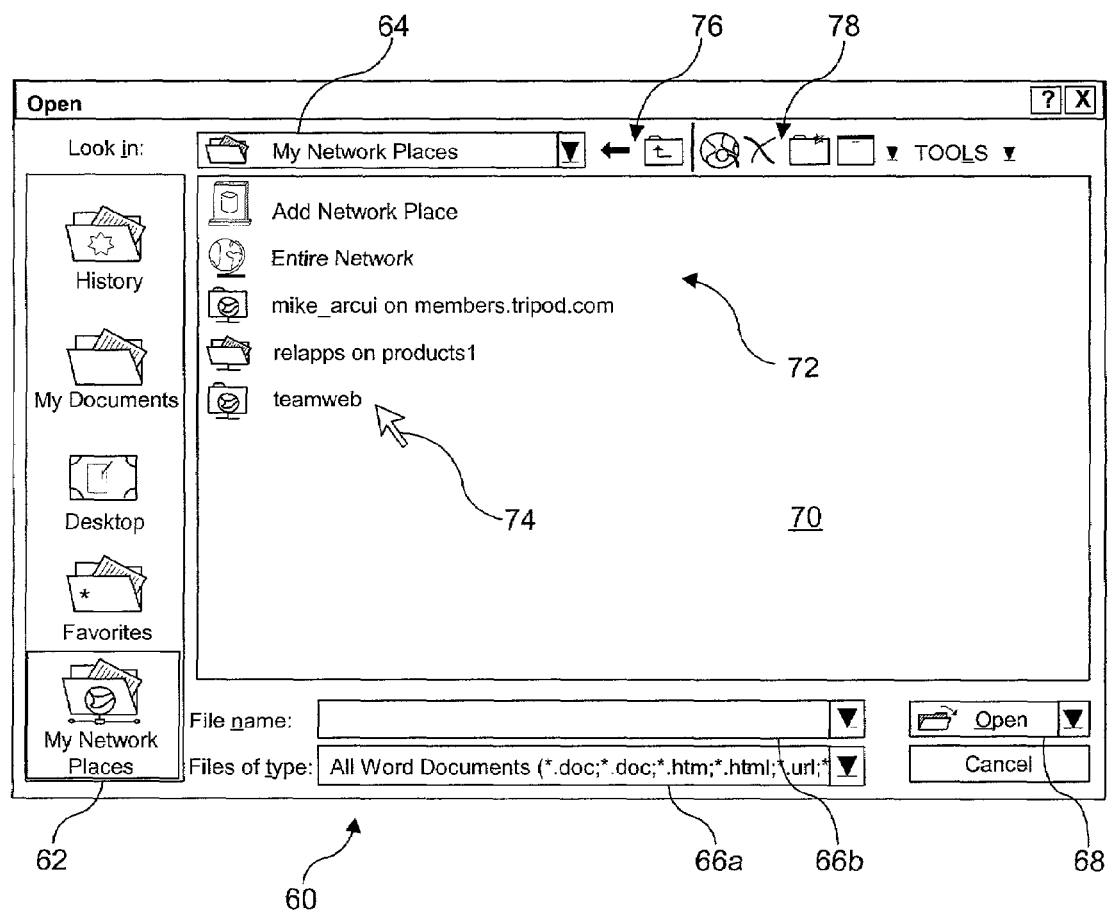
FIG. 2 (Prior Art) illustrates an exemplary File Open dialog box provided in Microsoft Corporation's WORD application program.

FIG. 2 illustrates an exemplary prior art File Open dialog box 60 for Microsoft Corporation's WORD application program. The dialog box includes an address icon area 62 from within which a user can select an icon representing a location for stored files. Similarly, the dialog box includes a current path box 64, which is a drop down selection box enabling a user to select a location (a drive and/or a folder within the general address or category selected) for accessing stored files. File type drop down boxes 66a and 66b further enable a user to refine the file selection process by selecting view only files with specific extensions. An Open button 68 is actuated once the user has selected a specific document to be opened by the word processing program.

File directory information is displayed within a content display area 70. The information shown in FIG. 2 is a sample list of URLs 72 representing the local and remote storage locations available to the user. The list is displayed in the standard format with an icon and text name for each storage location. A cursor 74 is shown positioned near one of the listed URLs and enables a user to select an individual URL and other elements in the dialog box. A user may also navigate among storage locations with navigation buttons 76. For example, a user may navigate back to a prior display or up one level in the hierarchy of files. Accessories buttons 78 also enable a user to perform a variety of standard file management and display functions, such as access favorite URLs, delete files or folders, add a new folder, change the view through a small menu, and perform limited functions through a small tools menu.

Figure 3A:
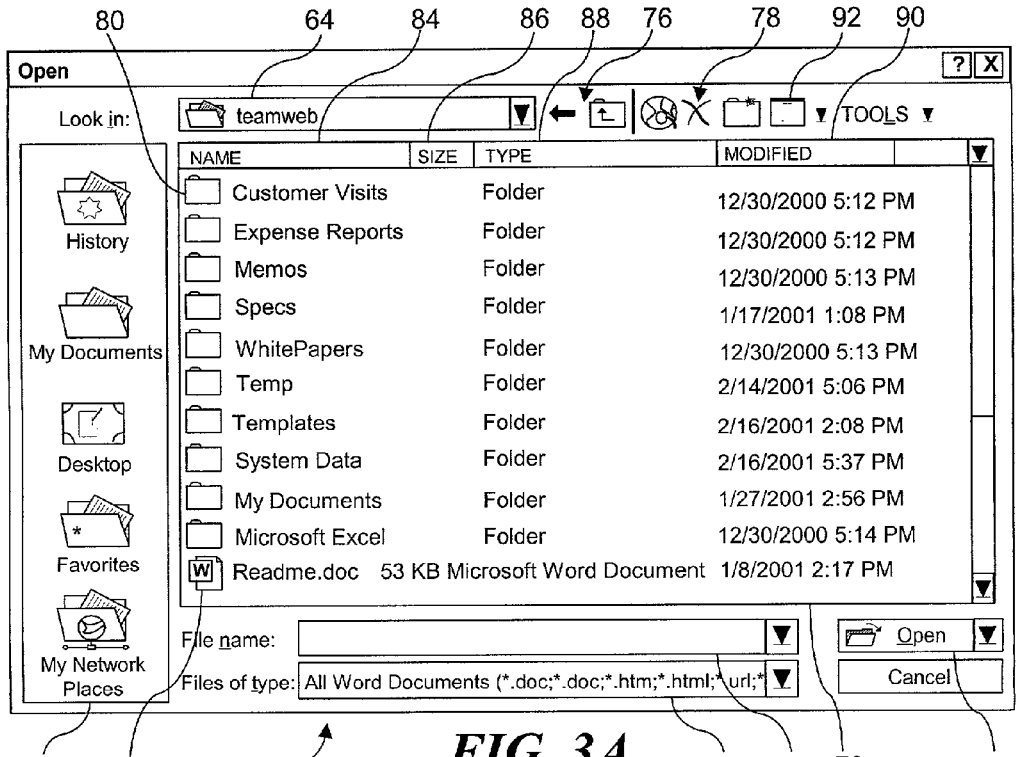
FIG. 3A (Prior Art) illustrates an exemplary File Open dialog box with the contents of a "teamweb" URL displayed in a conventional list format.

FIG. 3A illustrates a prior art File Open dialog box 60 with the contents accessed at a selected "teamweb" URL displayed in the standard list format. This prior art display includes small icons such as a folder icon 80 and a file icon 82, along with corresponding folder or file names, sizes, types, and last modification dates. A user can sort the listed information according to the above characteristics by selecting a corresponding column heading in the display, such as a name heading 84, a size heading 86, a type heading 88, or a modified heading 90. By selecting a Views drop down list box 92, the user can also change the display format to list the data in the "details" format shown, to display a "properties" box (not shown), or to display a "preview" box (not shown). Each display format utilizes standard file directory data controlled by the operating system of the storage device corresponding to the selected URL.

Figure 3B:
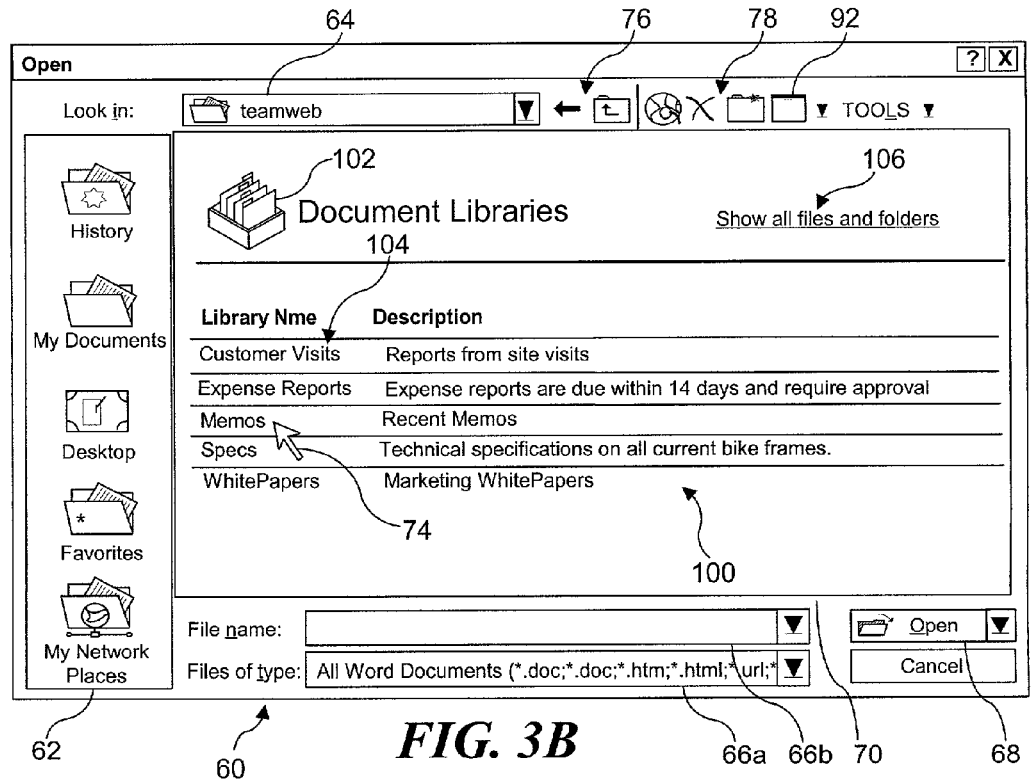
FIG. 3B illustrates a corresponding "Web view" display of the URL in FIG. 3A, as provided by the present invention.

FIG. 3B illustrates a "Web view" content 100 display for the same URL shown in FIG. 3A, but in accord with the present invention. Web view content 100 can include the same data as the file directory data and/or different data. However, the file information and other content displayed in a Web view page are controlled by the author of the Web view page, and are not limited to the conventional formats or specific data provided by the operating system. A Web view page is preferably defined in a Hypertext Markup Language (HTML) file and can include any element that a standard Web page can contain. For example, a graphic element 102 can be included as part of the heading. Such graphics and other content can be animated, or otherwise changing display elements and can include JavaScript™ elements, Flash elements, video, or audio clips, etc.

A Web view page can also include a hyperlink element 104 that will access a specific URL represented by the element if selected. However, a link element in a Web view page is processed somewhat differently than a standard hyperlink. A selected link element is recognized by the application program and by the browser module that is incorporated into the application program dialog box. Standard hyperlinks can be used in a Web view page, but are preferably processed to cause a separate browser window to open. Although standard Web pages associated with standard hyperlinks could be displayed within the dialog box, standard Web pages are preferably displayed in a separate browser window in order to utilize the dialog box for functions more directly related to the application program. For example, the File Open dialog box shown in FIG. 3B is preferably used to perform functions related to opening document library folders and document files associated with Microsoft Corporation's WORD application program.

Because Web view content 100 can be controlled by the Web view page author, the content displayed can be customized for a target user and for a specific application. Some folders and/or files may be system related or used for other purposes not specific to a desired application in which the Web view content is accessed. For example, large web sites may have scores of folders, but only 2 or 3 of these folders might be meant to be used for document storage. The other folders may contain scripts, images, and the pages that make up the structure of the web site. Such undesired files and folders can be filtered out, so that only folders and files relative to the target users or application are displayed. For instance, web views for the WORD application can show just the locations that are relevant to a WORD user trying to save a document to a web server. Additional information can also be included such as a description or graphic that will assist target users in finding the folder or file desired. If a user does not desire the assistance provided by a Web view page, the user can change back to a standard list view by selecting a "show all" link element 106, or selecting one of the standard views available through Views drop down list box 92.

Figure 4:
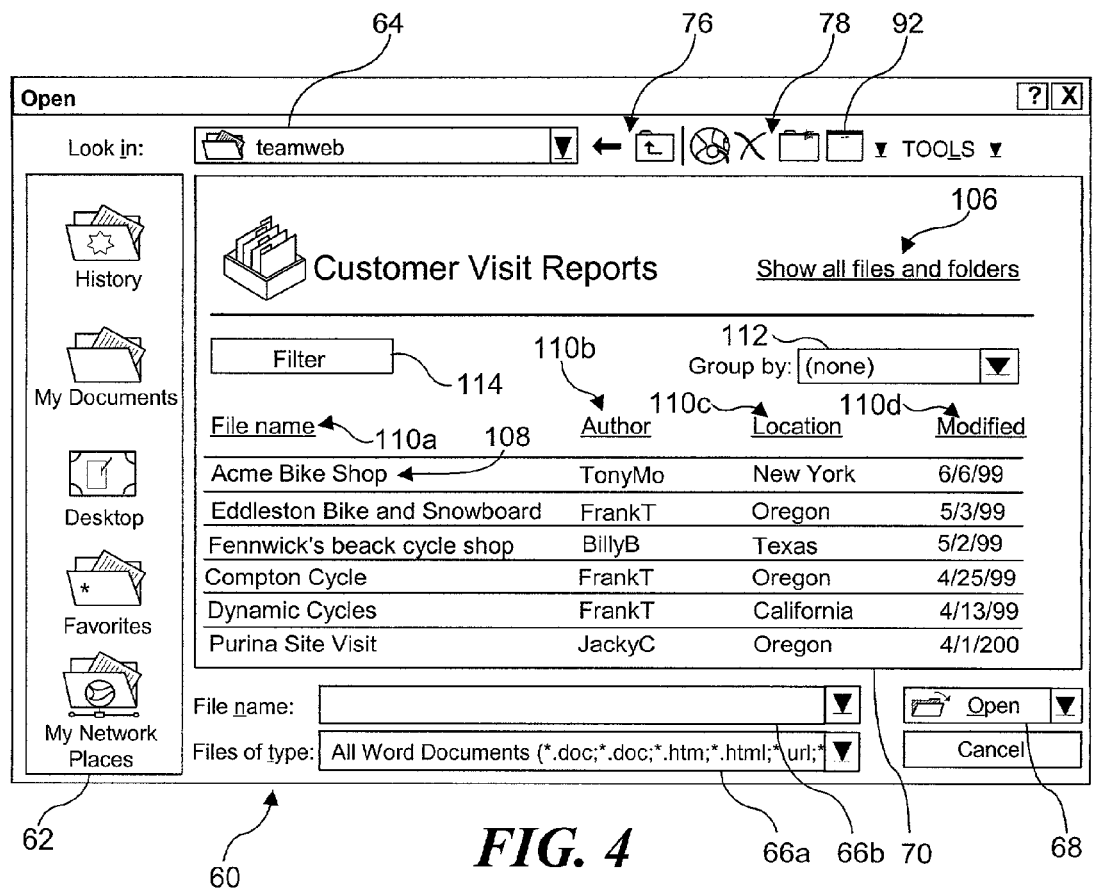
FIG. 4 illustrates an exemplary Web view, File Open dialog showing the contents of a selected folder.

FIG. 4 illustrates the File Open dialog box with another Web view page representing the content of a selected folder. This Web view page includes file link elements to individual document files, such as a file link element 108. The Web view page includes additional information not normally provided by the file directory system. For example, this Web view page displays the author of each document and the location of a customer to which each document file is related. The information displayed is sortable by parameters that the author of the Web view page has chosen, and these parameters are not limited to the conventional file directory parameters provided by the application program. In this example, the Web view page author has provided a sort link element for each parameter that the author chose. Thus, a user can select a location sort link element 110*c* to sort the document file information by the location of the customer associated with each document file. This kind of information is relevant to the target user, but is not provided by the conventional file directory system. Similarly, a user can filter the document file information by selecting a group or column via a filter group box 112, and then selecting a filter link 114. Any other function that can be accomplished by a browser module can be incorporated into Web view pages for use within a dialog box of an application program. Thus, the integrated browser module enables the functionality in an application program dialog box to match the functionality on a server.

Figure 5:
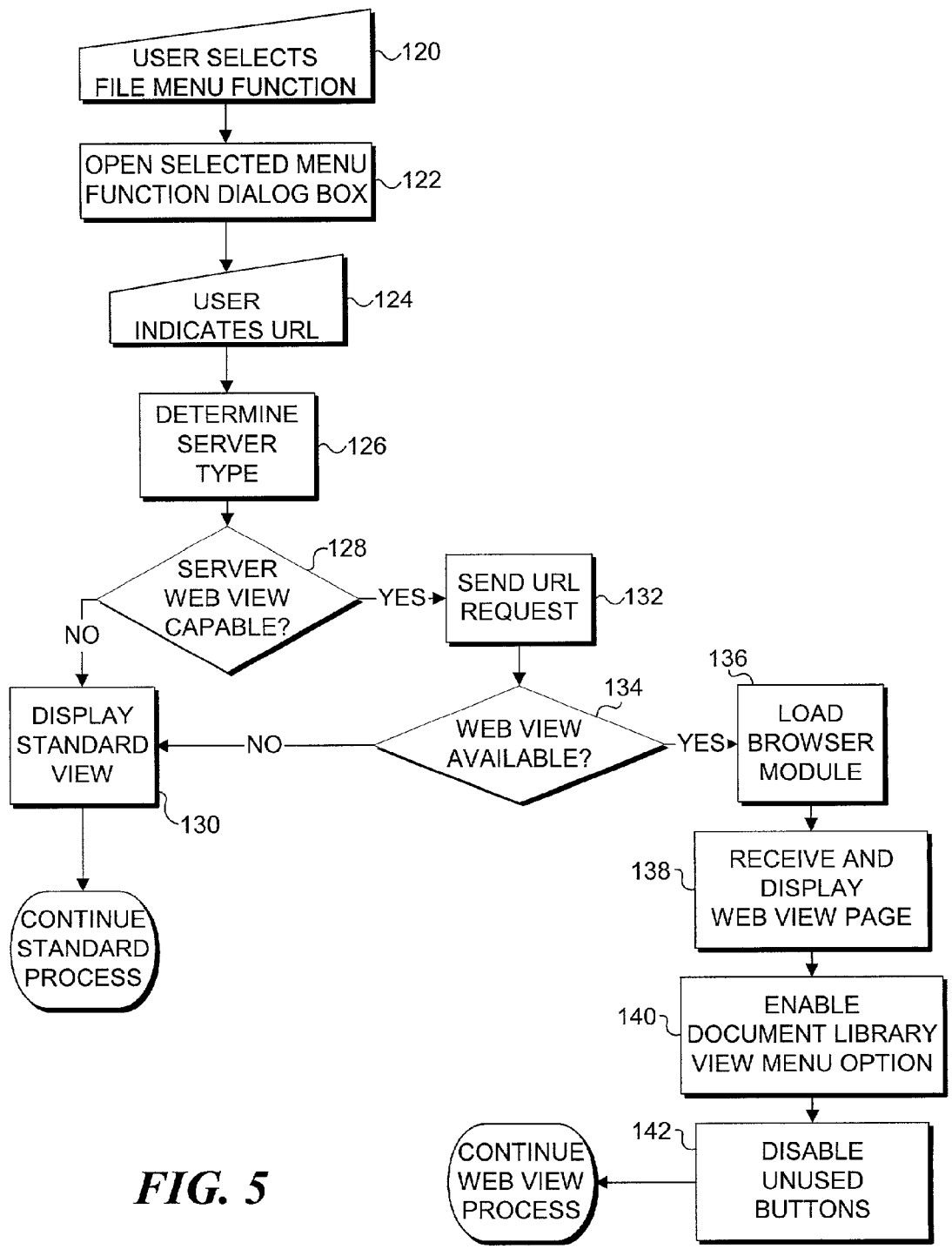
FIG. 5 is a flow diagram of logic used by a preferred embodiment of the present invention to initiate processing of Web view pages in an application program dialog box, on a client computing device.

FIG. 5 illustrates a flow diagram of logic used by a preferred embodiment of the present invention to initiate processing of Web view pages in an application program dialog box on a client computing device. At a step 120, a user selects a File menu function such as "New File," "Open File," "Save," "Save As," "Delete," etc. At a step 122, the application program opens the selected menu function dialog box. Preferably, the application program is an office productivity application program such as Microsoft Corporation's WORD, EXCEL, POWERPOINT, ACCESS, etc. However, the present invention can be adapted to provide Web views within dialog boxes of any application program and is not limited to those noted above. For purposes of discussion, the Microsoft WORD word processing application program will be described as it has been adapted to include the present invention. As described above, the File Open menu function provides a specific example of the present invention. Thus, the Microsoft WORD application program initiates a Microsoft Office File Open dialog object at step 122 (i.e., msoFileOpenDialog, which is hereinafter referred to as the "dialog object").

At a step 124, a user indicates the URL for a location of a document that the user wishes to open. The location is typically a folder on a remote computer acting as a server. At a step 126, the application program dialog box sends a request to the server for information indicating the type of server being accessed. Specifically, the dialog object calls a "Web Folders" function to obtain folder and file information at the requested URL. The Web folders function then invokes an object linking and embedding-data base (OLE-DB) object, which sends a hypertext transfer protocol (HTTP) remote procedure call (RPC) to the URL, requesting information to identify the type of server. The corresponding server process is described below with respect to FIG. 11, wherein the server returns information identifying the type of server being accessed.

At a decision step 128, the dialog object receives the identifying information from the server and determines whether the server is capable of providing Web view pages. If not, the server would have already sent the conventional file directory information along with the server type identifying information. In that case, the dialog object would display the conventional view of folders and files for the requested URL at a step 130.

However, if the server is capable of providing Web view pages, the dialog object will preferably determine the type of server that was accessed, such as a SharePoint Team Services (SPTS) server, Exchange 2000™ server, SharePoint Portal Server (SPPS), etc. At a step 132, the OLE-DB object sends an appropriate HTTP request to the particular URL selected. Specifically, if a Exchange 2000™ or SharePoint Portal server is being accessed, the OLE-DB object sends an HTTP query for an additional identifying property to determine whether the server has a Web view page available for the specific URL requested. Alternatively, if an SPTS server was detected, the OLE-DB object generates and sends a query such as the following:

http:/URL/_vti_bin/owssvr.dll?dialogview=fileopen&location=folder where URL and folder represent values that would specify a URL address and a folder name, respectively.

At a decision step 134, the dialog object receives a response from the server and determines whether a Web view page is available. Specifically, if a Exchange 2000™ server or an SPPS was accessed, and the requested identifying property is returned with a value of "true," the accessed server has a Web view page available for the requested URL, and the server has already sent the corresponding Web view page. Alternatively, if the accessed server was an SPTS, and a Web view page is available for the requested URL, the server simply returns the corresponding Web view page, which naturally indicates that a Web view page is available. If the accessed server is capable of providing Web view pages, but does not have a Web view page available for the specific URL requested, the standard file directory information is provided by the server and displayed by the dialog object at step 130.

However, if a Web view page is available for the specific URL requested, the dialog object loads a browser module at a step 136. The browser module may be loaded within the memory space reserved for the application program to accelerate processing, or loaded in distinct memory spaces. The browser module includes the MSHTML.DLL that forms the core of Microsoft Corporation's INTERNET EXPLORER browser program, and the application program accesses the MSHTML.DLL to obtain and/or filter information about elements of a Web view page displayed by the browser module. At a step 138, the loaded browser module receives and displays the Web view page obtained from the server. The browser module interacts with the dialog object and displays the Web view page within the dialog box content display area described above.

The dialog object also enables a Web view menu option that is available to users via Views drop down list box 92 described above with respect to FIG. 3A through FIG. 4. At a step 142, the dialog object also disables certain buttons not currently used with a Web view page, such as a "new folder" button and a "rename" button.

Figure 6:
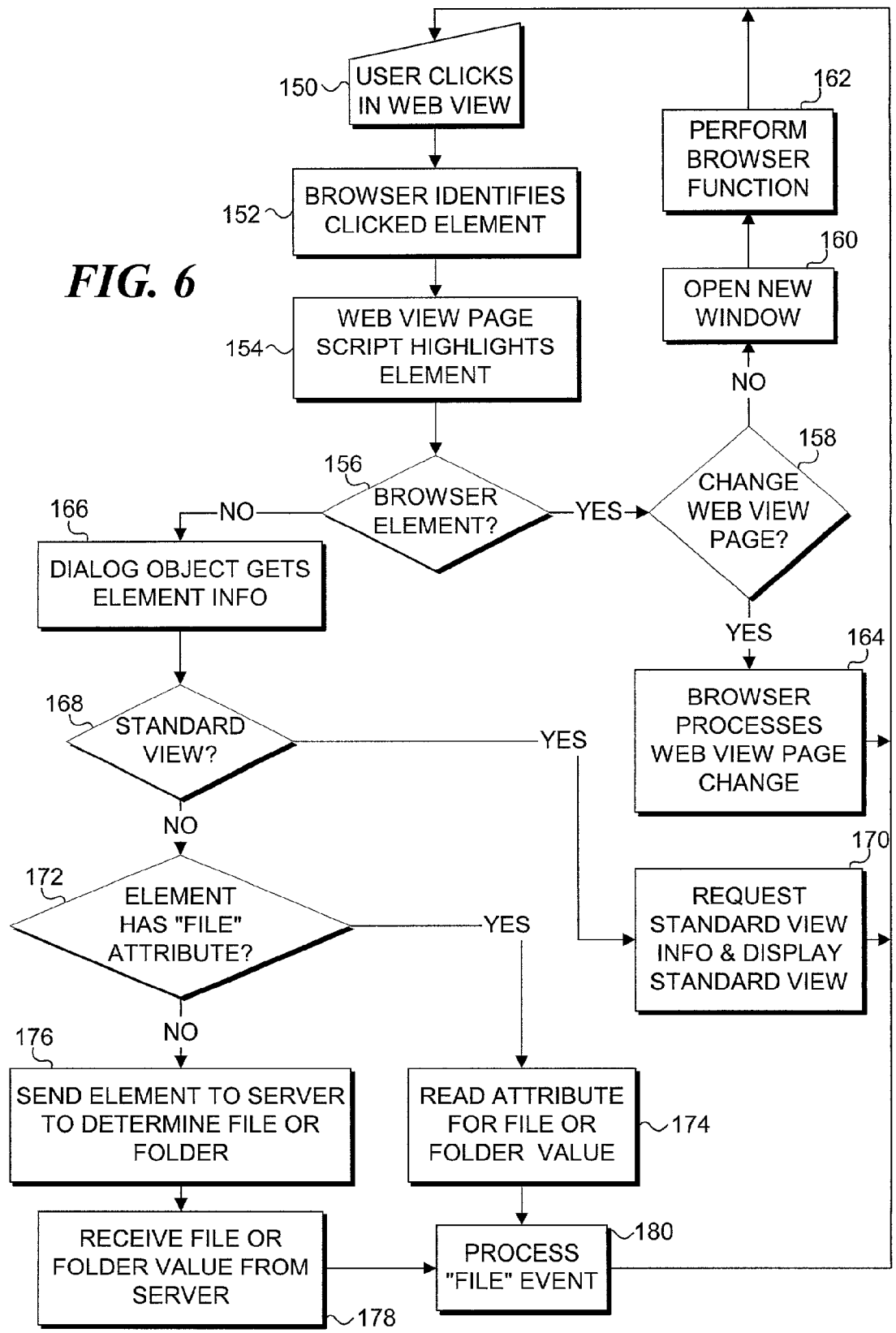
FIG. 6 is a flow diagram of logic used by a preferred embodiment of the present invention to process a user selection of an element in a Web view page displayed in the content display area of the application program dialog box, on a client computing device.

FIG. 6 illustrates a flow diagram of logic used by a preferred embodiment of the present invention to process a user selection of an element in a Web view page displayed in the content display area of the application program dialog box on a client computing device. For discussion purposes, it is assumed that the user has navigated into one of the document library folders, as illustrated in FIG. 4. The process of navigating through folders via the Web view page is similar to the process described below with regard to FIGS. 8 and 9. A document library typically contains subfolders (not shown in FIG. 4), and/or individual document files. Based on the Web view page displayed, a user will typically employ a pointing device to move a cursor onto an element within the Web view page and click on the element or otherwise select an element at a step 150 of FIG. 6. At a step 152, the browser module identifies the selected element by the position of the cursor. At a step 154, script code within the Web view page highlights the selected element if appropriate. For example, if a user selected a file link element 108 (shown in FIG. 4), script code within the Web view page will highlight the selected file link element. At a decision step 156, the browser module determines whether the selected element can be processed by the browser module.

If the browser module determines that the selected element can be processed directly by it, the browser module then it determines, at a decision step 158, whether the selected element represents a request to change the Web view page or to perform an external browser function. For example, if the selected element was a standard hyperlink to a standard Web page not directly related to functions of the dialog object or application program, the browser module will relay a message to the operating system to initiate a new browser program instance in a new browser window at a step 160. The new browser program instance then performs the appropriate function at a step 162. The browser module operating with the dialog object then waits for another user click at step 150.

Figure 7:
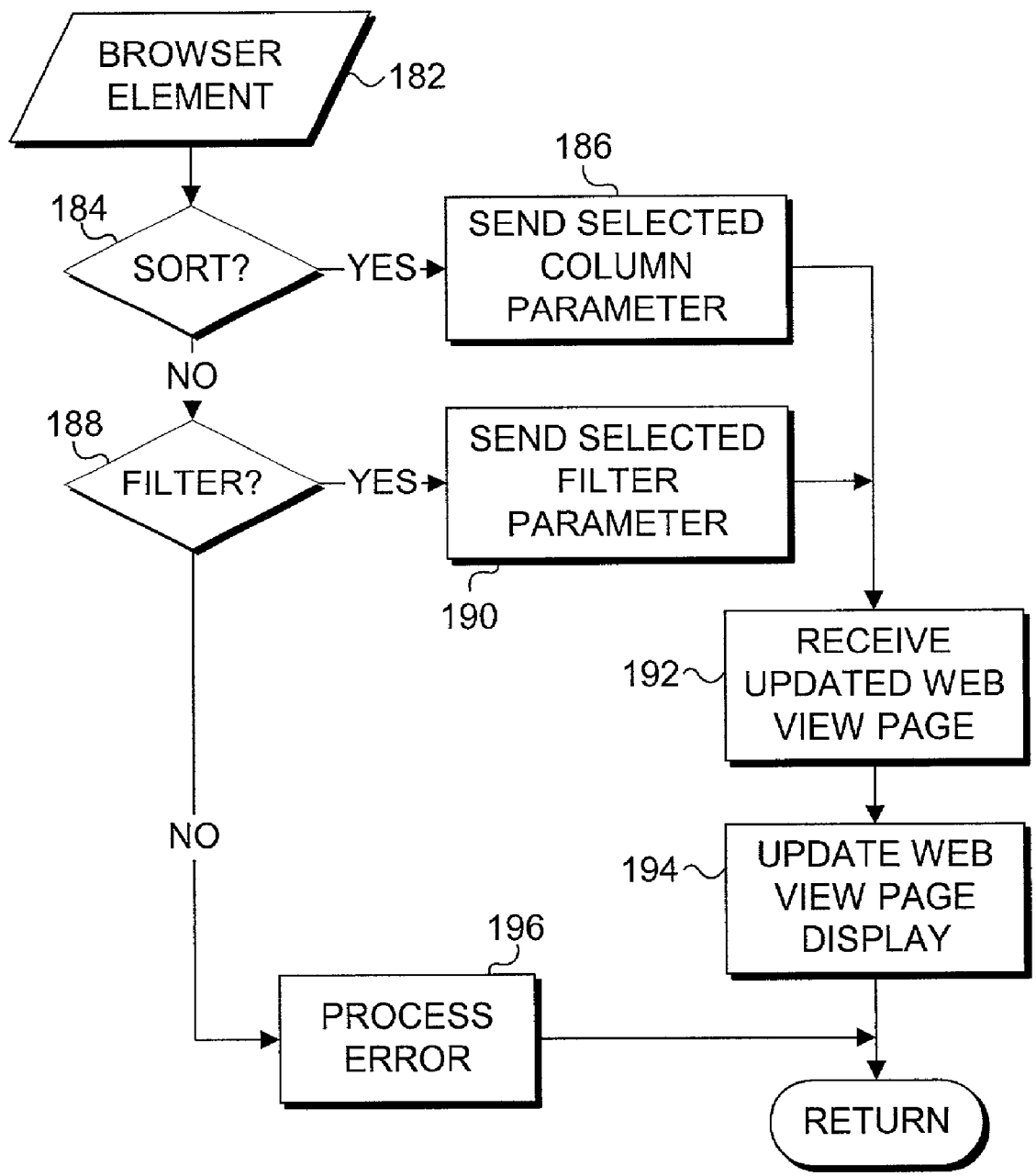
FIG. 7 is a flow diagram of logic used by the client device browser within the dialog object to process Web view page changes, such as sorting and filtering of files.

If the selected element represents a request to change the Web view page, such as to sort or filter information on the Web view page, the browser module operating with the dialog object processes the Web view page change at a step 164. Details of this step are illustrated in FIG. 7. Once that processing is complete, the browser module awaits another user click at step 150.

If at decision step 156, the browser module determines that the selected element cannot be processed by the browser module, the browser module passes the appropriate information about the selected element to the dialog object at a step 166. Alternatively, the dialog object or other part of the application program detects the selected element via the operating system, such as by recognizing a highlighted element. At a decision step 168, the dialog object determines whether the selected element represents a request to change to a standard view of the folders and files at the selected URL. For example, if the selected element was the "show all" element 106 (shown in FIG. 4), the dialog object obtains the standard file directory information and displays the standard view in the content display area at a step 170. Again, control is passed back to step 150 to await a further user click.

If, however, the selected element does not represent a request to change back to the standard view, the dialog object determines, at a decision step 172, whether the selected element has a "file" attribute. Because the Web view pages preferably include HTML instructions, the information related to the selected element is preferably in the form of an HTML tag. The tag includes an HTTP request for information from another specific URL represented by the selected element. The tag also includes a File attribute that can have the value of "folder" or "file." If the tag includes a File attribute, the dialog object reads the attribute value, at a step 174, to determine whether the value is "file" or "folder."

If the selected element does not include a File attribute, the dialog object sends the selected element tag to the server, at a step 176, to determine whether the selected element corresponds to a file of folder. At a step 178, the dialog object receives a "file" or "folder" value from the server. Once the value of the File attribute is known, the dialog object processes the appropriate file event at a step 180.

Figure 12:
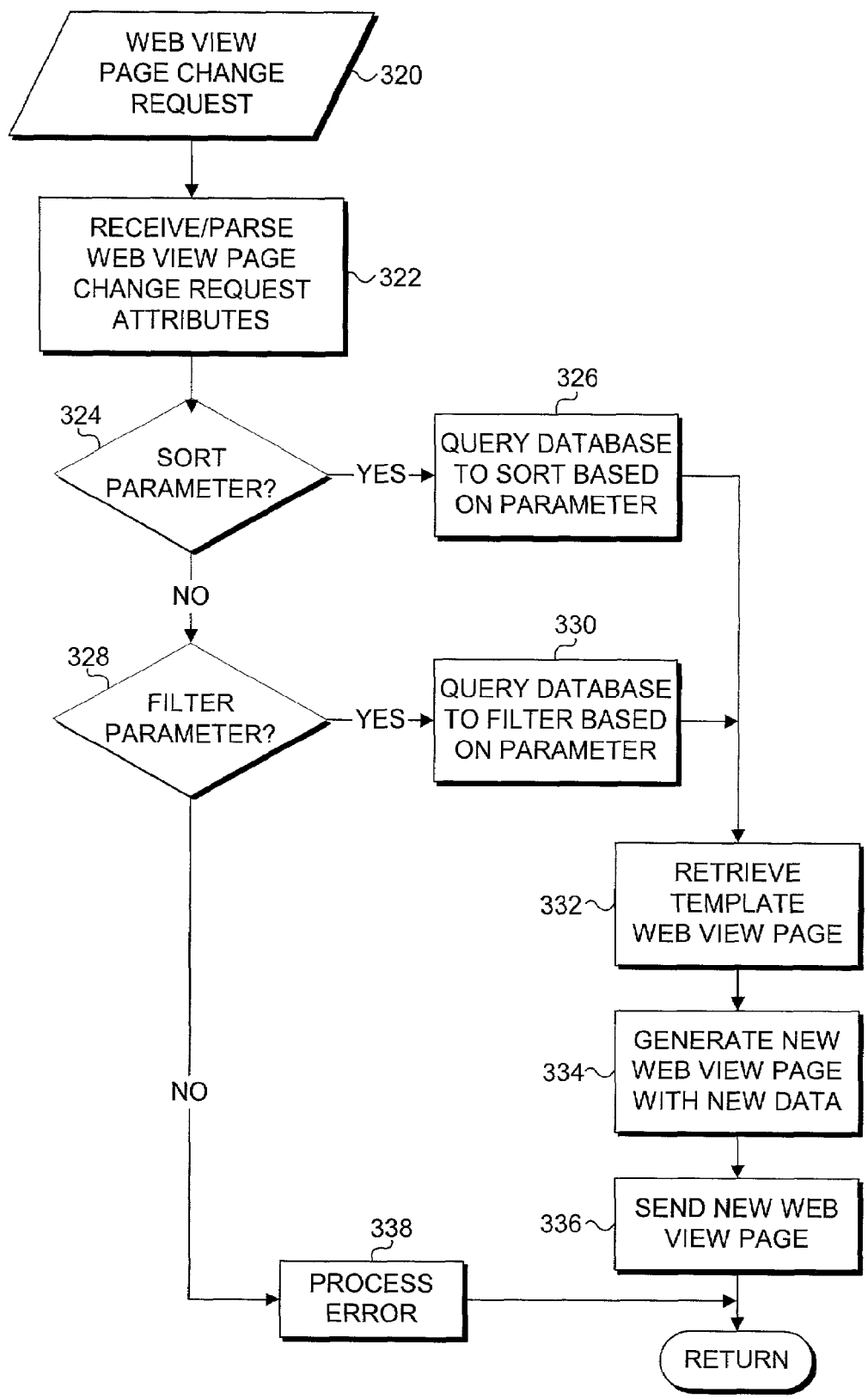
FIG. 12 is a flow diagram of logic used by the server computing device to process user requests to change the Web view page.

FIG. 7 illustrates a flow diagram of logic used by the client device browser within the dialog object to process Web view page changes, such as sorting and filtering and thus provides details of step 164 in FIG. 6. The corresponding server side processing is illustrated in FIG. 12. The browser module has previously determined that it could process the selected element, so that the selected element is referred to as a browser element 182. At a decision step 184, the browser determines whether browser element 182 represents a request to sort information provided in the Web view page. If so, the browser module sends a request to the server, at a step 186, to sort the information based on a sort parameter represented by the browser element. For example, the sort parameter may be the column label "Location," which would serve as a sort key in a database query by the server.

Alternatively, at a decision step 188, the browser module determines whether the browser element represents a request to filter information on the Web view page. If so, the browser modules sends a request to the server, at a step 190, to filter the information based on a filter parameter represented by the browser element, such as a selected group.

At a step 192, the browser module receives an updated Web view page from the server. At a step 194, the browser then updates the content display area with the updated Web view page. If an unknown browser element is selected, the browser processes an error at a step 196 (which includes alerting the user of the error state).

Figure 8:
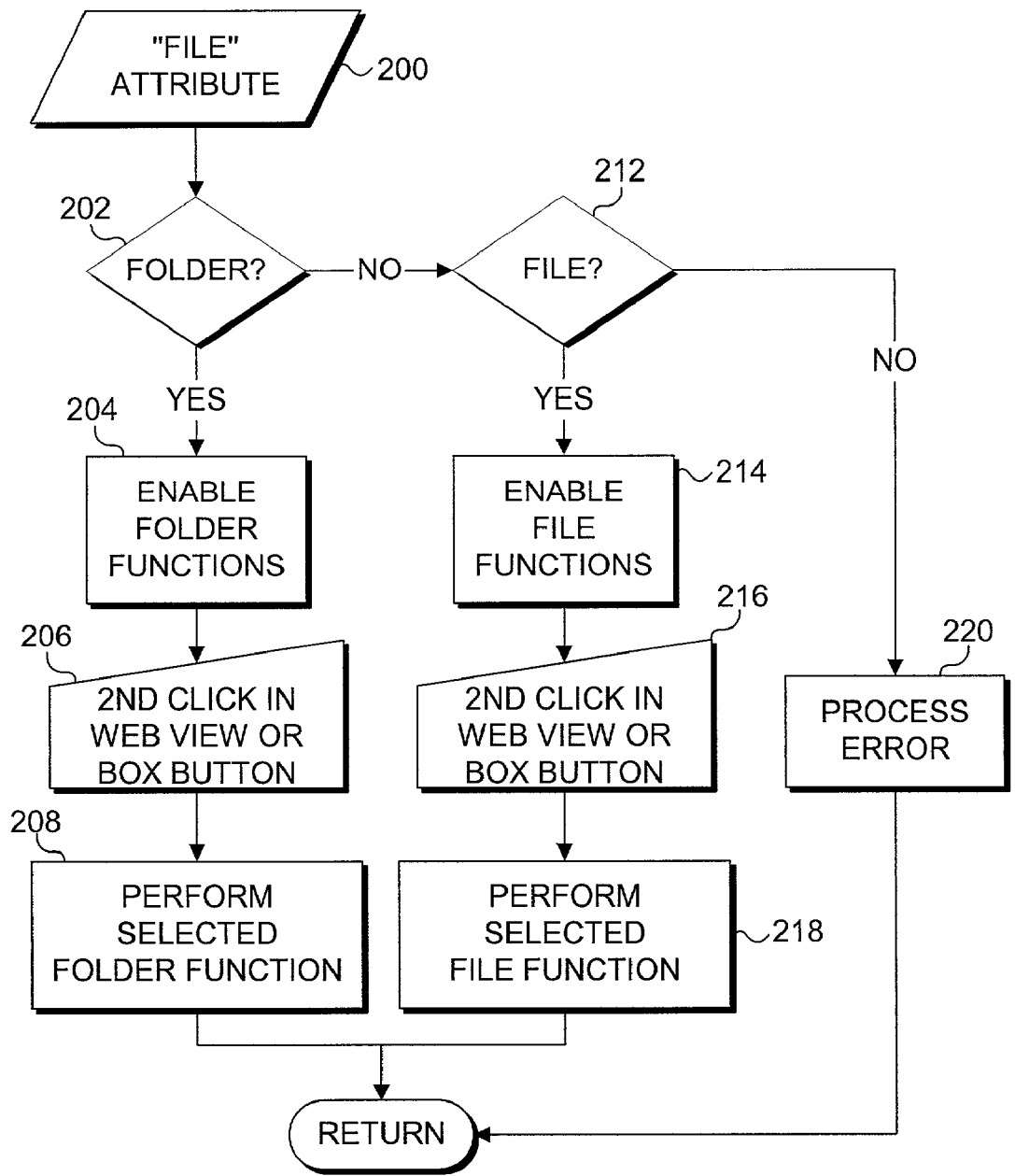
FIG. 8 is a flow diagram of logic used by the dialog object on the client computing device, to process File events.

FIG. 8 illustrates a flow diagram of logic used by the dialog object on the client computing device to process File events and provides details corresponding to step 180 of FIG. 6. The dialog object uses a File attribute value 200 corresponding to the selected element to perform the desired "folder" or "file" function. At a decision step 202, the dialog object determines whether the File attribute value equals "folder." If so, the dialog object enables folder functions at a step 204. The dialog object then waits for a second click or selection in the Web view page, or for selection of a button in the dialog box at a step 206. After receiving a second click, the dialog object performs the selected "folder" function at a step 208. Further details of the "folder" function processes are provided in FIG. 9.

Figure 10:
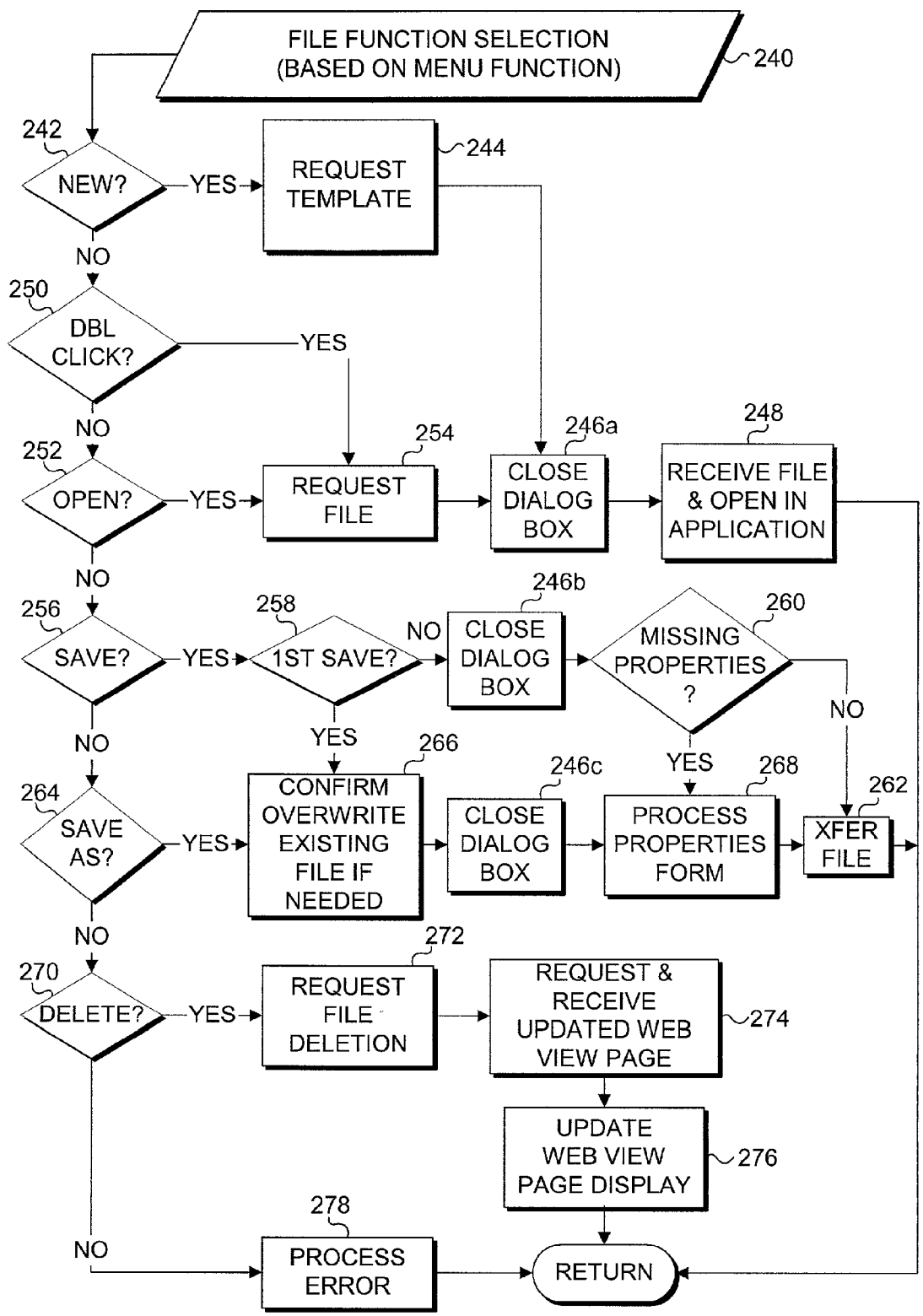
FIG. 10 is a flow diagram of logic used by the client computing device to process a selected element that represents a user request to the dialog object to perform a "folder" function as a result of the second click.

If the File attribute value was not "folder," the dialog object determines at a decision step 212 whether the File attribute value equals "file." If so, the dialog object enables "file" functions at a step 214. The dialog object then waits for a second click or selection in the Web view page, or for selection of a button in the dialog box at a step 216. Once a second click or other selection is provided, the dialog object performs the selected file function at a step 218. Details of File function processing are illustrated in FIG. 10. If the File attribute value is unknown, the dialog object processes an error at a step 220.

Figure 9:
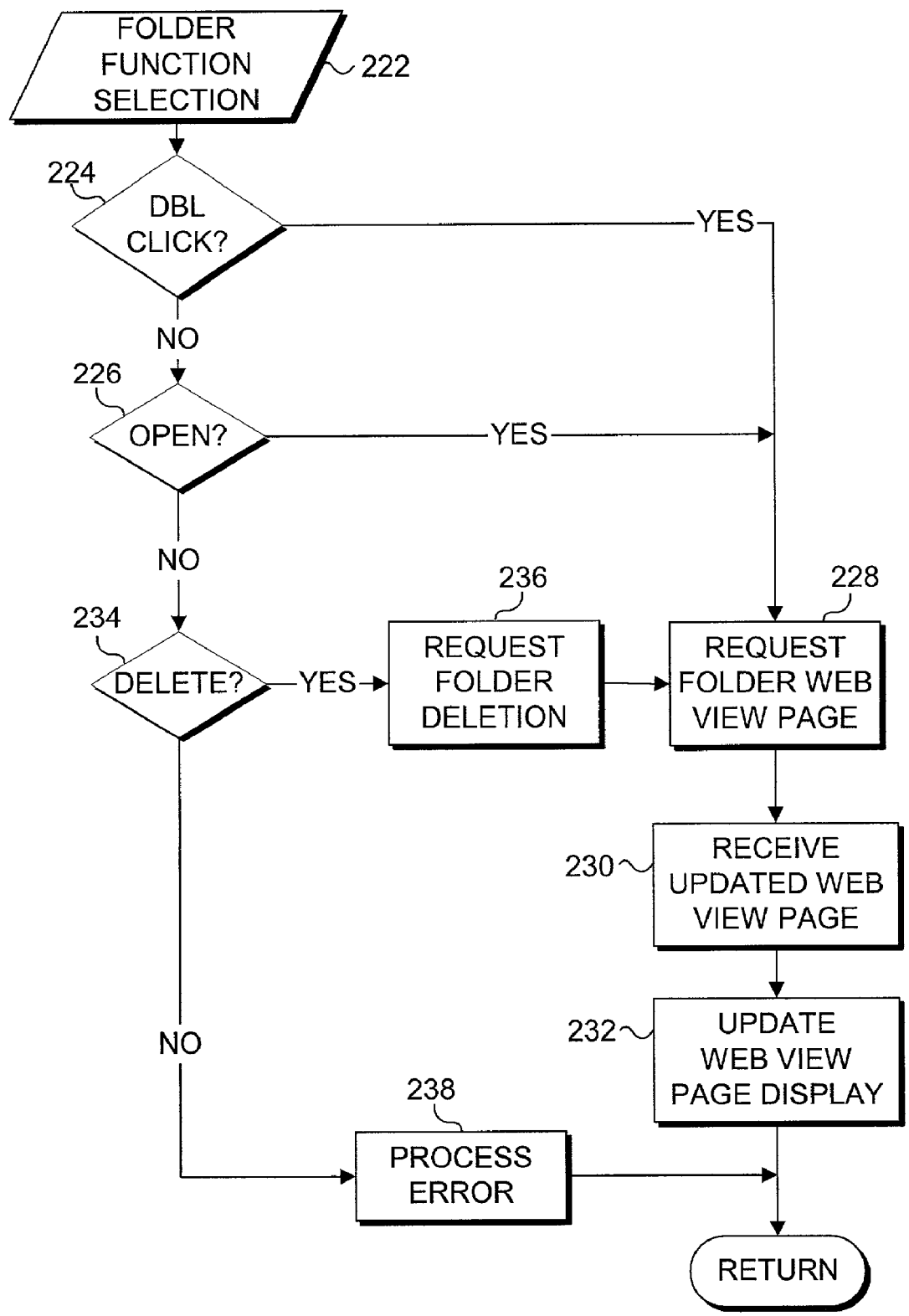
FIG. 9 is a flow diagram of logic performed by the client computing device for processing a "folder" function.
Figure 13:
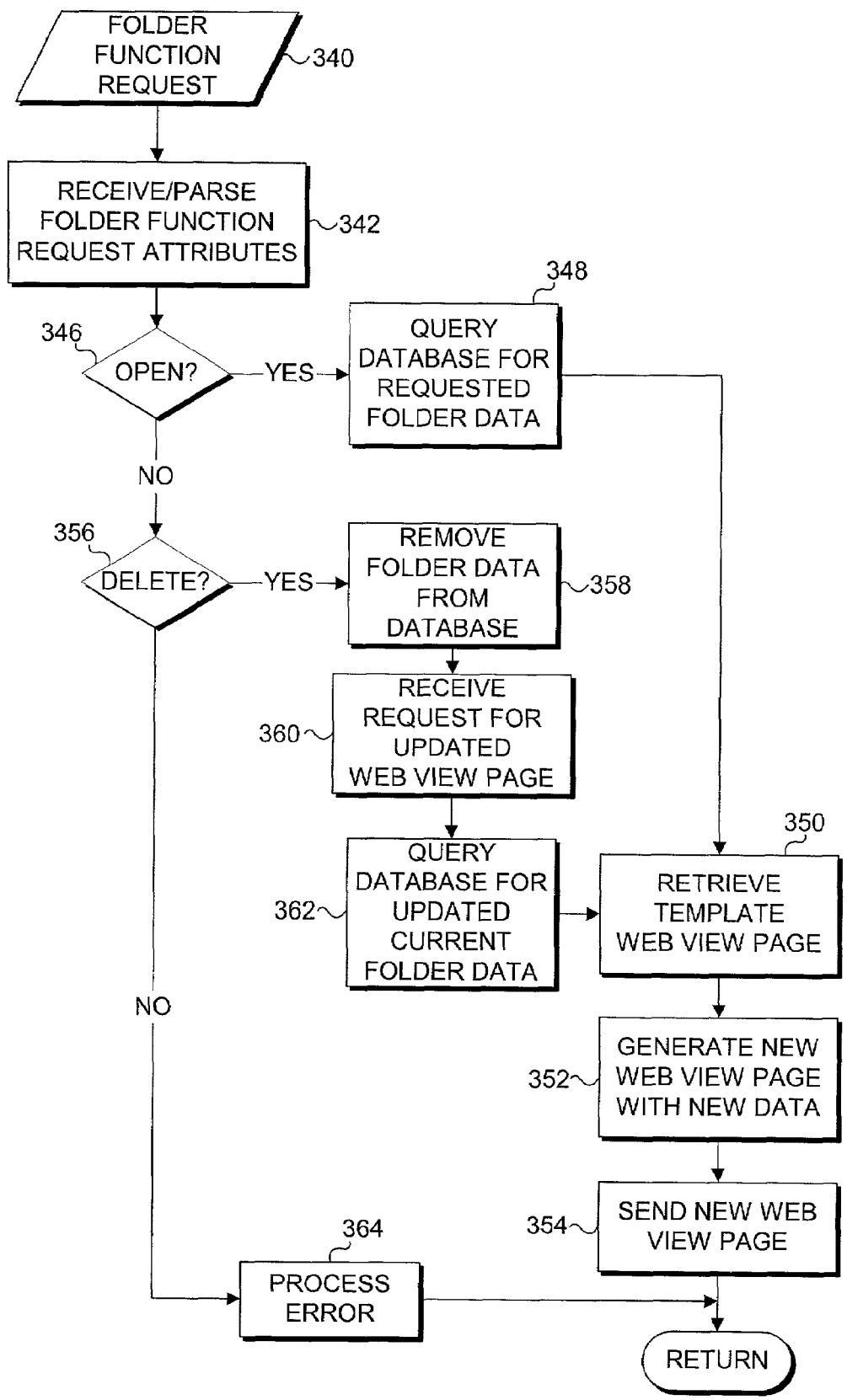
FIG. 13 is a flow diagram of logic used by the server or other computing device to process a request for a folder function.

FIG. 9 illustrates a flow diagram of logic performed by the client computing device when processing a "folder" function. Corresponding server side processing is illustrated in FIG. 13. As suggested above, to simplify the drawings and this discussion, not all of the possible functions are illustrated. However, enough examples are provided so that one of ordinary skill in the art would understand how to implement other functions in accord with the present invention. For instance, FIG. 9 illustrates processing of a selected element that represents a user request to the dialog object to perform a "folder" function as a result of the second click described above. In this context, the selected element is referred to herein as a folder function selection 222. At a decision step 224, the dialog object determines whether the second click was the second of a double click on a folder link element. Alternatively, the dialog object determines, at a decision step 226, whether the folder function selection corresponds to the "open" button in the dialog box. In either case, the dialog object requests a Web page view of the contents of the selected folder at a step 228. The dialog object then receives an updated Web view page from the server at a step 230 and displays the updated Web view page at a step 232.

If folder function selection 222 corresponds to a request to delete a folder, the dialog object determines, at a decision step 234, whether to request a folder deletion on the server at a step 236. Unlike existing folder deletions through application program dialog boxes, a folder deleted through a Web view page is permanently deleted at the server. The folder is not temporarily stored in a "recycle bin" on the client computing device. After the dialog object requests the folder deletion, the dialog object makes a second request for an updated Web view page of the current folder at step 228. If the folder function selection is unknown, the dialog object processes an error at a step 238.

Figure 14:
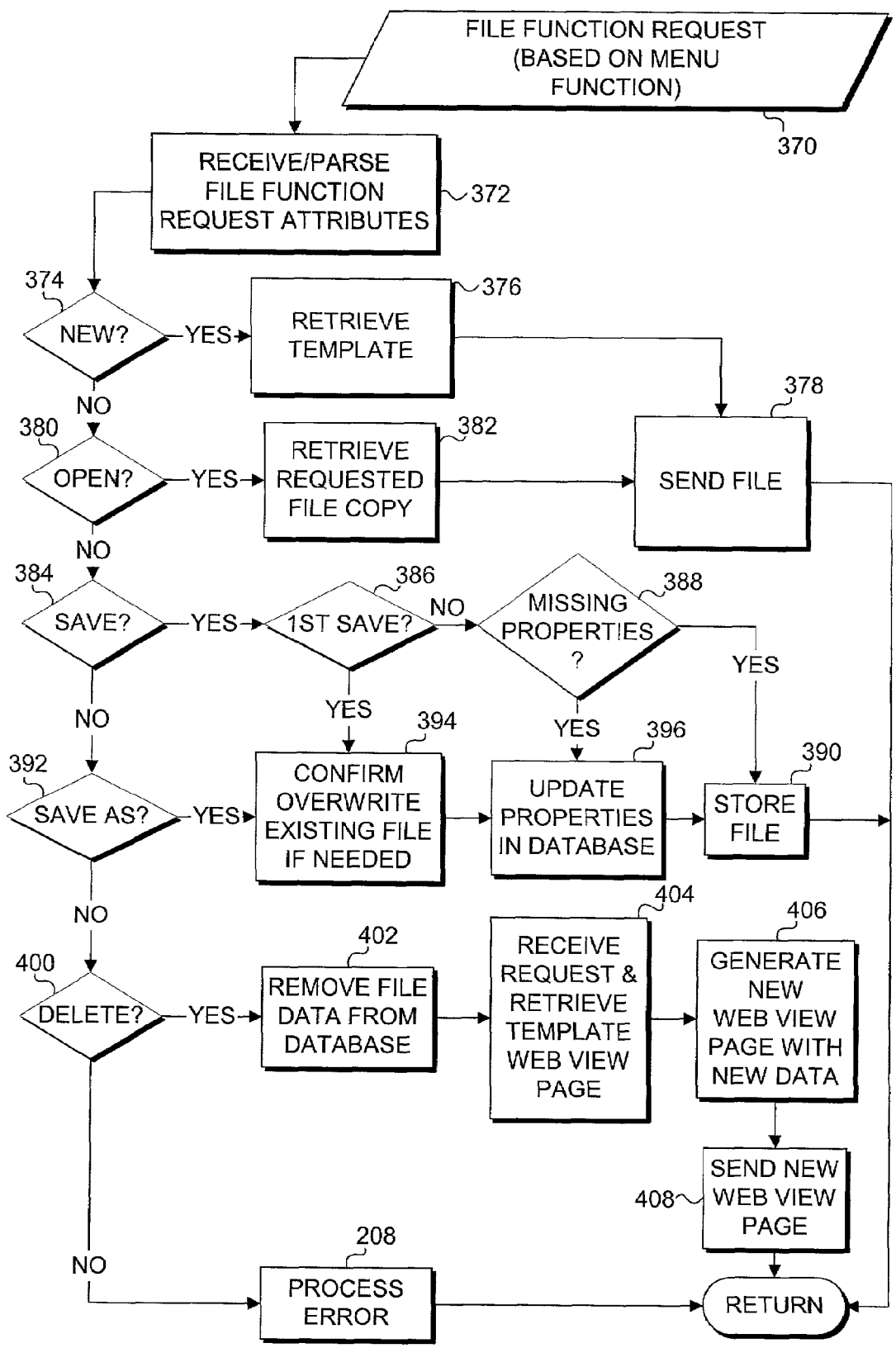
FIG. 14 is a flow diagram of logic performed by the server to process a request for a file function.

FIG. 10 illustrates a flow diagram of logic used by the client computing device to process a selected element that represents a user request to the dialog object to perform a "folder" function as a result of the second click described above. Preferably, separate dialog objects will process separate "file" functions, in a manner similar to the way current application programs process separate "file" functions with separate dialog objects. For example, a "new file" dialog object will process requests for a new document file, or a "save as" dialog object will process a request to save a document file with a new name. Thus, FIG. 10 illustrates logic used by the application program via a plurality of dialog objects to process "file" functions. Corresponding server side processing is illustrated in FIG. 14.

In the context of "file" functions, the selected element is referred to herein as a file function selection 240. At a decision step 242 of FIG. 10, the dialog object determines whether a new document file was requested. If so, the dialog object requests a corresponding template document file from the server. At a step 246*a*, the dialog object closes the dialog box. The dialog object then receives the template document file at a step 248, and opens the template document file in the application program.

Alternatively, if file function selection 240 is a file link element corresponding to an existing document file, the dialog object determines, at a decision step 250, whether the second click represents the second of a double click. If not, at a decision step 252, the dialog object determines whether the second click corresponds to a selection of the "open" button in the dialog box. In either case, the dialog object requests the selected document file from the server at a step 254. At step 246*a*, the dialog object closes the dialog box. When the selected document file is returned from the server, the dialog object opens the selected document file in the application program at step 248.

To save a document file currently in-work in the application program, the dialog object determines, at a decision step 256, whether the second click represents a file function selection to save the current document file. If so, the dialog object then determines, at a decision step 258, whether the second click represents a request to save the current document file for the first time. If so, the current document has not been saved before, so the dialog object follows the "save as" process described below. However, if the "save" request is to overwrite a previous version of the same document file that was already saved, the dialog object closes the dialog box at a step 246*b* and determines, at a decision step 260, whether any necessary file properties are missing and must be supplied by the user. If all necessary file properties are available, the dialog object transfers a copy of the document file to the server at a step 262. However, if necessary file properties are missing, the dialog object processes a properties form as described below for the "save as" process.

At a decision step 264, the dialog object determines whether the second click corresponds to a file function selection to save the current document file with a new name. If so, the dialog object determines whether the new name corresponds to an existing document file name on the server and, if needed, requests the user to confirm that the user wishes to overwrite the existing document file at a step 266. If the user confirms the overwrite, or the user previously entered a unique document file name, the dialog object closes the dialog box at a step 246c, and processes a properties form at a step 268. The dialog object displays a properties form in a separate window and requests the user to enter information relevant to the target users who may view the document file properties, especially in a Web view page. For example, the properties form may request the user to enter the location of a customer to which the document file pertains. This location information corresponds to the location information displayed in the Web view page of FIG. 4. The properties form enables users to store almost any other information about a document file, in addition to the conventional file directory information, for display in Web view pages. The properties form is preferably an HTML or other Web-based form. The properties form is submitted to the server, which stores the properties information in a database used to generate the Web view pages. Once the properties form is complete and submitted, the dialog object transfers a copy of the current document file to the server at step 262.

In a manner similar to the folder deletion process described above, the dialog object determines, at a decision step 270, whether the second click corresponds to a file function selection representing a request to delete a file. If so, the dialog object sends a request to the server at a step 272 to delete the selected file. At a step 274, the dialog object then makes a second request for, and receives, an updated Web view page of the current folder. The dialog object refreshes the content display area with the updated Web view page at a step 276. If the dialog object detects an unknown file function selection, the dialog object processes an error at a step 278.

Figure 11:
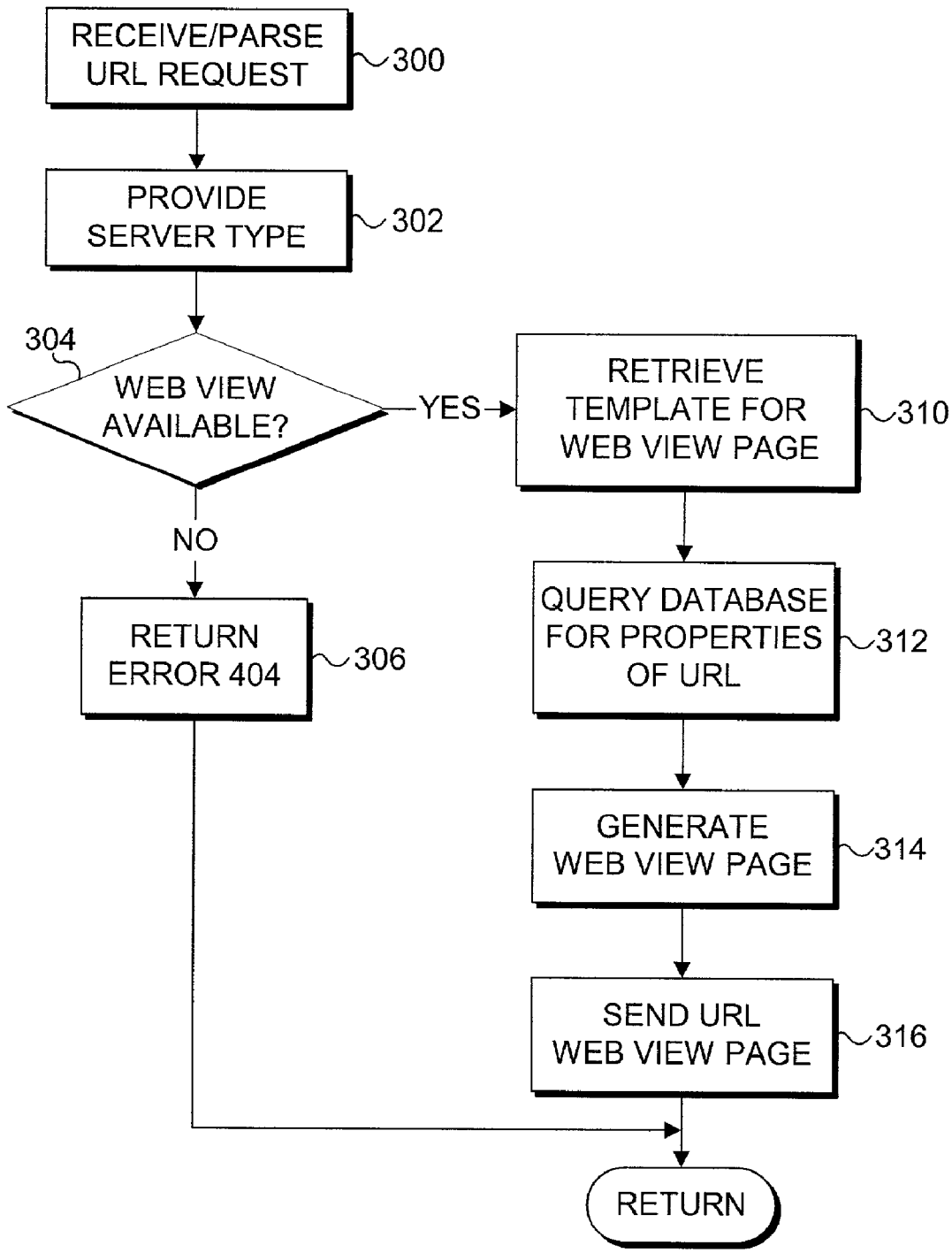
FIG. 11 is a flow diagram of logic used by a server or other computing device to process an initial request for a Web view page from the client computing device.

FIG. 11 illustrates a flow diagram of logic used by the server computing device to process an initial request for a Web view page from the client computing device. The corresponding client process is illustrated in FIG. 5. At a step 300 of FIG. 11, the server receives the HTTP request for information on the server type and parses the request for the specific requested URL. At a step 302, the server returns information on the server type to the client computing device. Depending on the server type, the server returns the requested identifying property or standard file directory information. Assuming the server is capable of providing Web view pages, the server determines, at a decision step 304, whether a Web view page is available for the specific requested URL. If no Web view page is available for the specific requested URL, the server returns an error code 404 to the client computing device at a step 306, informing the client computing device that no Web view page is available for the requested URL. The server instead returns conventional file directory information to the client.

However, if a Web view page is available for the requested URL, the server retrieves a template Web view page at a step 310 from the server's storage. As described above, preferably the template Web view page is an HTML document including formatting instructions for displaying information relating to the requested URL. At a step 312, the server queries a database for properties related to folders and/or files stored at the requested URL. The database may be a SQL database or other database adapted to provide data for Web view pages. The server then integrates the retrieved template Web view page with the properties obtained from the database to generate a complete Web view page at a step 314. Preferably, a generated Web view page conforms with accepted Web standards for HTML documents or other Web documents. Thus, the generated Web view page preferably can be viewed as generated, and/or with additional or different information, using a standard browser in a separate window outside the application program. Once the Web view page is generated, the server sends the generated Web view page, at a step 316, to the dialog object of the application program running on the client computing device.

FIG. 12 illustrates a flow diagram of logic used by the server computing device to process user requests to change the Web view page. The corresponding client side process is illustrated in FIG. 7. The server receives a Web view page change request 320 at a step 322, and parses the request attributes for relevant parameters. As described above, the request is preferably an HTTP request, identifying the URL and other attributes that the server uses to generate the appropriate Web view page. At a decision step 324, the server determines whether the request was to sort information in the existing Web view page. The server also determines the value of a sort parameter corresponding to a selected sort link element, such as a column heading in the Web view page. At a step 326, the server queries the database to sort the information corresponding to the requested URL, based on the value of the sort parameter.

If the request was not to sort, at a decision step 328, the server determines whether the request was instead to filter the information corresponding to the selected URL, e.g., in regard to a particular type of file, and determines the value of the requested filter parameter, such as "*.doc" or "*.dot." At a step 330, the server queries the database for the information related to the value of the filter parameter. Non-conventional filter parameters can also be used.

After obtaining the appropriate sort or filter data from the database, the server retrieves a template Web view page at a step 332, and generates a new Web view page at a step 334 with the new data obtained from the database. The server then sends the new Web view page to the dialog object at the client computing device at a step 336. If an unknown request was made to change the Web view page, the server processes an error at a step 338.

FIG. 13 illustrates a flow diagram of logic used by the server computing device to process a request for a folder function. Corresponding client side processing is illustrated in FIG. 9. The server receives a folder function request 340 at a step 342 and parses the request for attributes relevant to the folder function request. Again, only a sample set of functions is illustrated. For example, at a decision step 346, the server determines whether the folder function request was to open an existing folder. If so, the server queries the database for information relevant to the folder URL that was requested to be opened. As above, the server then retrieves a template Web view page at step 350, and generates a new Web view page at a step 352, using the new data obtained from the database. The server then sends the new Web view page to the dialog object at the client computing device at a step 354.

At a decision step 356, the server determines whether the folder function request was to delete a folder. If so, the server removes the relevant folder data from the database at a step 358. The server also deletes the folder from the file directory of the server. Because this deletion is accomplished at the server database, the folder information is not retained in a recycle bin at the client computing device. At a step 360, the server then receives a request from the client device for an updated Web view page. At a step 326, the server queries the database for updated data related to the currently open folder. The currently open folder is normally the URL logically located just above the deleted folder in the file directory hierarchy. Again, the server retrieves a template Web view page at a step 350 and generates a new Web view page at step 352, using the current folder data. The server then sends the new Web view page to the client computing device at step 354. If an unknown folder function was requested, the server processes an error at a step 364.

FIG. 14 illustrates a flow diagram of logic performed by the server to process a request for a file function. Corresponding client side processing is illustrated in FIG. 10. As discussed above, file functions are preferably performed on the client computing device by separate dialog objects in the application program. However, the server can process the file function request without separate objects, because the server simply reacts to attributes of an HTTP file function request 370. The server receives the request at a step 372 and parses the request for file function attributes. At a decision step 374, the server determines whether the request includes an attribute corresponding to creation of a new document file. If so, the server retrieves a document file template at a step 376. The server then sends the document file template to the client computing device at a step 378.

Similarly, at a decision step 380, the server determines whether the file function request was to open an existing file stored on the server. If so, the server retrieves a copy of the requested file at a step 382 and sends the requested file to the client computing device at step 378.

At a decision step 384, the server determines whether the requested file function was to save a document file currently open in the application program. If so, the server determines, at a decision step 386, whether the document file has been saved on the server in the past. If this is the first time that the document file is being saved on the server, the server follows the "save as" process described below. If the document file was previously saved on the server, the server determines, at a decision step 388, whether any properties were omitted on a properties form. If a properties form was submitted, the server follows the "save as" process described below. If the document file is simply being overwritten and all existing properties are available in the database, the server stores the updated document file at a step 390.

If the document file is being saved for the first time, or the server determines, at a decision step 392, that the file function request was to save the document file under a new name, the server checks at a step 394, whether the document file name is already being used for another file. If necessary, the server obtains confirmation from the user to overwrite the existing file. At a step 396, the server receives the properties form submitted from the client and updates the database with the properties provided. The server then stores the document file at step 390.

At a decision step 400, the server determines whether the requested file function was to delete an existing document file. If so, the server removes the corresponding document file data from the database at a step 402 and deletes the document file from the server. At a step 404, the server receives a request for an updated Web view page and retrieves a template Web view page. The server then generates a new Web view page at a step 406, with updated data for the folder URL currently displayed in the dialog box on the client. The server then sends the new Web view page to the client at a step 408. If an unknown file function is requested, the server processes an error at a step 410.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for a productivity application to access server-based functionality by enabling a web view within a particular application dialog box, the method comprising:

a dialog object sending a request to a server for information identifying the type of server being accessed;

the dialog object receiving a response from the server, the response comprising information identifying the type of server;

determining, from the information identifying the type of server, that the server supports web view pages;

the application sending an attribute to a server, the attribute identifying a program function of the application;

the application receiving a response from the server, the response verifying that the server recognizes the attribute identifying the program function;

the application determining if the server supports a web view page for a particular application dialog box, the determination being made by recognition of an attribute by the server;

upon determining that the server supports a web view page for the particular application dialog box, receiving a web view page from the server;

displaying the web view page within the particular application dialog box;

receiving user input corresponding to an element within the web view;

determining when the element is to be processed by a browser module and when the element is to be processed by the dialog box; and when determining the element is to be processed by the browser module, then processing the element by the browser module; and when determining the element is not to be processed by the browser module, then passing appropriate information about the element to the dialog box;

upon determining that the server does not support a web view page for the particular application dialog box, formatting a response comprising an indication that the particular application dialog box is not supported; and sending the response to the application.

2. The method of claim 1, wherein the view page corresponds to file management functionality.

3. The method of claim 1, wherein the element within the web view represents a file.

4. The method of claim 1, wherein processing the element comprises saving a file, copying a file, renaming a file, or deleting a file.

5. The method of claim 1, wherein the view page comprises a listing of a plurality of files.

6. The method of claim 5, wherein the listing of files is sorted.

7. The method of claim 1, wherein the application is a word processor or spreadsheet.

8. The method of claim 1 further comprising: upon the element having been processed, receiving and displaying a new web view page.

9. The method of claim 1, wherein being processed by the browser module comprises executing a separate program to display content.

10. The method of claim 1, wherein the element within the web view represents a file.

11. A computer program product comprising computer-readable storage media having encoded thereon computer-executable instructions which, when executed, enable the method recited in claim 1.

12. The computer program product of claim 11, wherein the view page corresponds to file management functionality.

13. The computer program product of claim 11, wherein the element within the web view represents a file.

14. The computer program product of claim 11, wherein processing the element comprises saving a file, copying a file, renaming a file, or deleting a file.

15. The computer program product of claim 11, wherein the view page comprises a listing of a plurality of files.

16. The computer program product of claim 11, wherein the listing of files is sorted.

17. A system comprising one or more computer processors and computer-readable storage media upon which is executing the method recited in claim 1.

18. The system of claim 17, wherein the view page corresponds to file management functionality.

19. The system of claim 17, wherein the element within the web view represents a file.

20. The system of claim 17, wherein processing the element comprises saving a file, copying a file, renaming a file, or deleting a file.

21. The system of claim 17, wherein the view page comprises a listing of a plurality of files.

22. The system of claim 17, wherein the application is a word processor or spreadsheet.

23. A method for enabling server-based functionality to be accessed through a web view page within a particular application dialog box, the method comprising:
receiving by a server a request from an application for information identifying the type of server being accessed;
sending a response from the server to the application, the response comprising information identifying the type of server;
receiving by a server a request from an application corresponding to a particular application dialog box, the request comprising a unique attribute identifying an application program function;
the server determining if the server supports a web view page for the particular application dialog box, the determination being made by recognition of the attribute;
upon determining that the server supports a web view page for the particular application dialog box, formatting a response comprising a web view page to be displayed by the particular application dialog box;
upon determining that the server does not support a web view page for the particular application dialog box, formatting a response comprising an indication that the particular application dialog box is not supported; and
sending the response to the application.

24. The method of claim 23, wherein the view page corresponds to file management functionality.

25. The method of claim 23, wherein determining, comprises the step of confirming that the computing resource recognizes an application program function attribute in a request to the computing resource to generate a Web view page.

26. The method of claim 23, wherein the view page comprises a listing of a plurality of files.

27. The method of claim 26, wherein the listing of files is sorted.

28. The method of claim 23, further comprising the step of:
the server responding to a request resulting from a user having selected an element of the web page view.

29. The method of claim 28, wherein responding to a requests comprises sending a new web page view to be displayed within the application dialog box.

30. The method of claim 29, wherein the response from the server comprises a new web view page to be displayed by the application.

31. A computer program product comprising computer-readable storage media having encoded thereon computer-executable instructions which, when executed, enable the method recited in claim 23.

32. The computer program product of claim 31, wherein the view page corresponds to file management functionality.

33. The computer program product of claim 31, wherein the element within the web view represents a file.

34. The computer program product of claim 31, wherein the view page comprises a listing of a plurality of files.

35. The computer program product of claim 31, The method of claim 14 wherein the listing of files is sorted.

36. The computer program product of claim 31, wherein the method further comprising the step of: the server responding to a request resulting from a user having selected an element of the web page view.

37. A system comprising one or more computer processors and computer-readable storage media upon which is executing the method recited in claim 23.

38. The system of claim 37, wherein the view page corresponds to file management functionality.

39. The system of claim 37, wherein the element within the web view represents a file.

40. The system of claim 37, wherein the view page comprises a listing of a plurality of files.

41. The system of claim 40, wherein the listing of files is sorted.

42. The system of claim 37, wherein the method executing further comprising the step of: the server responding to a request resulting from a user having selected an element of the web page view.

* * * * *